(12) United States Patent
Tehrani et al.

(10) Patent No.: US 9,082,090 B2
(45) Date of Patent: Jul. 14, 2015

(54) SYSTEM, METHOD, AND COMPUTER PROGRAM PRODUCT FOR RESOURCE COLLABORATION OPTIMIZATION

(75) Inventors: Saeid Tehrani, Farmington Hills, MI (US); Babak Makkinejad, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1379 days.

(21) Appl. No.: 12/179,343

(22) Filed: Jul. 24, 2008

(65) Prior Publication Data

US 2010/0023947 A1   Jan. 28, 2010

(51) Int. Cl.
*G06F 9/46* (2006.01)
*G06Q 10/06* (2012.01)

(52) U.S. Cl.
CPC .......... *G06Q 10/06* (2013.01); *G06Q 10/06311* (2013.01)

(58) Field of Classification Search
USPC ................................. 718/104; 705/7.13, 7, 13
See application file for complete search history.

(56) References Cited

U.S. PATENT DOCUMENTS

| | | | |
|---|---|---|---|
| 5,815,638 A | 9/1998 | Lenz et al. | |
| 6,823,315 B1 * | 11/2004 | Bucci et al. | 705/7.16 |
| 7,379,888 B1 * | 5/2008 | Mahapatro | 705/7.13 |
| 7,962,358 B1 * | 6/2011 | Fernandez et al. | 705/7.12 |
| 2003/0101118 A1 * | 5/2003 | Macken et al. | 705/35 |
| 2004/0098154 A1 * | 5/2004 | McCarthy | 700/97 |
| 2005/0021384 A1 * | 1/2005 | Pantaleo et al. | 705/9 |
| 2005/0050551 A1 | 3/2005 | Sparago et al. | |
| 2005/0216324 A1 * | 9/2005 | Maithell et al. | 705/8 |
| 2006/0095311 A1 * | 5/2006 | Thompson | 705/9 |
| 2008/0255910 A1 * | 10/2008 | Bagchi et al. | 705/8 |
| 2008/0300954 A1 * | 12/2008 | Cameron et al. | 705/9 |

OTHER PUBLICATIONS

Abdel-Hamid et al. (Lessons Learned from Modeling the Dynamics of Software Development, Dec. 1989, pp. 1426-1438).*
Scott et. al (Predicting Programming Group Productivity: A Communications Model, Aug. 1975, pp. 411-414).*
Di Penta at el. (The Effect of Communication Overhead on Software Maintenance Project Staffing: a Search-Based Approach, Oct. 2007, pp. 315-324).*
Simmons (Communications: a software group productivity dominator, Nov. 1991, pp. 454-462).*

* cited by examiner

*Primary Examiner* — George Giroux
(74) *Attorney, Agent, or Firm* — Van Cott, Bagley, Cornwall & McCarthy

(57) ABSTRACT

A method including receiving a plurality of roles in a data processing system and adding a part-time resource to at least one role. The method also includes determining, in the data processing system, if a project duration has changed as a result of adding the part-time resource, and if the project duration has changed, repeating the process at the adding step. The method also includes storing results corresponding to the resources assigned to roles. There is also a similar data processing system and machine-usable medium.

21 Claims, 3 Drawing Sheets

US 9,082,090 B2

SYSTEM, METHOD, AND COMPUTER PROGRAM PRODUCT FOR RESOURCE COLLABORATION OPTIMIZATION

CROSS-REFERENCE TO OTHER APPLICATION

The present application has some Figures or specification text in common with, but is not necessarily otherwise related to, U.S. patent application Ser. No. 11/904,084, filed Sep. 26, 2007, which is hereby incorporated by reference.

TECHNICAL FIELD

The present disclosure is directed, in general, to resource optimization.

BACKGROUND OF THE DISCLOSURE

When a company bids or contracts to perform a service or develop a product for a customer, it is often necessary to estimate the number of part-time and full-time project team members that will be required. Generally, a rudimentary method is used to determine the team size, by estimating the number of required Full Time Equivalents (FTEs) as the total amount of effort needed in hours divided by the duration of the project months and the number of FTE work hours in a month. The resulting FTE figure is the estimated number of FTEs needed to be working each month, which can then be satisfied by full-time employees, part-time employees, or a combination of these.

These types of calculations are necessarily inaccurate since they cannot take into account many other factors that may affect the result, including the skill set and structure of the team, the efficiency of work and communications, and many other factors. Often, the projects fail because these kinds of efforts are not considered.

In fact, a typical approach in project management has been to try to account for the collaboration overhead by adjusting the estimate based on a "gut" feel of what more may be required using a percentage of the original estimate as additional overhead, another approach that is typically inaccurate and inconsistent. Further, most generalized estimations fail to consider or account for a significant source of inefficiency.

SUMMARY OF THE DISCLOSURE

According to various disclosed embodiments, there is a method including receiving a plurality of roles in a data processing system and adding a part-time resource to at least one role. The method also includes determining, in the data processing system, if a project duration has changed as a result of adding the part-time resource, and if the project duration has changed, repeating the process at the adding step. The method also includes storing results corresponding to the resources assigned to roles.

According to various disclosed embodiments, there is a data processing system comprising a processor and accessible memory, wherein the data processing system is configured to perform a process of receiving a plurality of roles; adding a part-time resource to at least one role; determining if a project duration has changed as a result of adding the part-time resource; if the project duration has changed, repeating the process at the adding step; and storing results corresponding to the resources assigned to roles.

According to various disclosed embodiments, there is a machine-usable medium encoded with computer-executable instructions. The computer-executable instructions include instructions for receiving a plurality of roles in a data processing system and instructions for adding a part-time resource to at least one role. The computer-executable instructions also include instructions for determining, in the data processing system, if a project duration has changed as a result of adding the part-time resource, and instructions for, if the project duration has changed, repeating the process at the adding step. The computer-executable instructions also include instructions for storing results corresponding to the resources assigned to roles.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
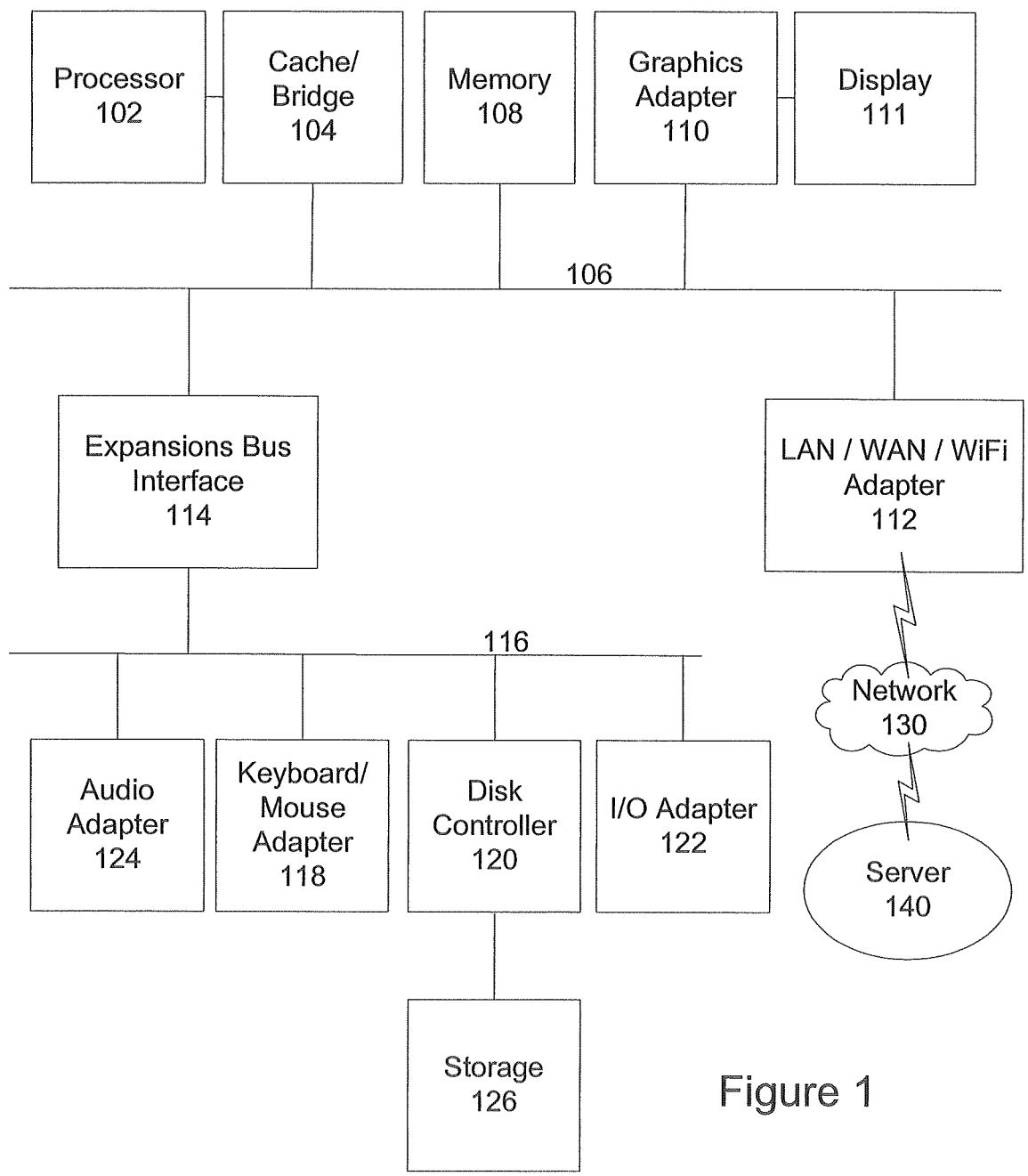
FIG. 1 depicts a block diagram of a data processing system in which an embodiment can be implemented.
Figure 2:
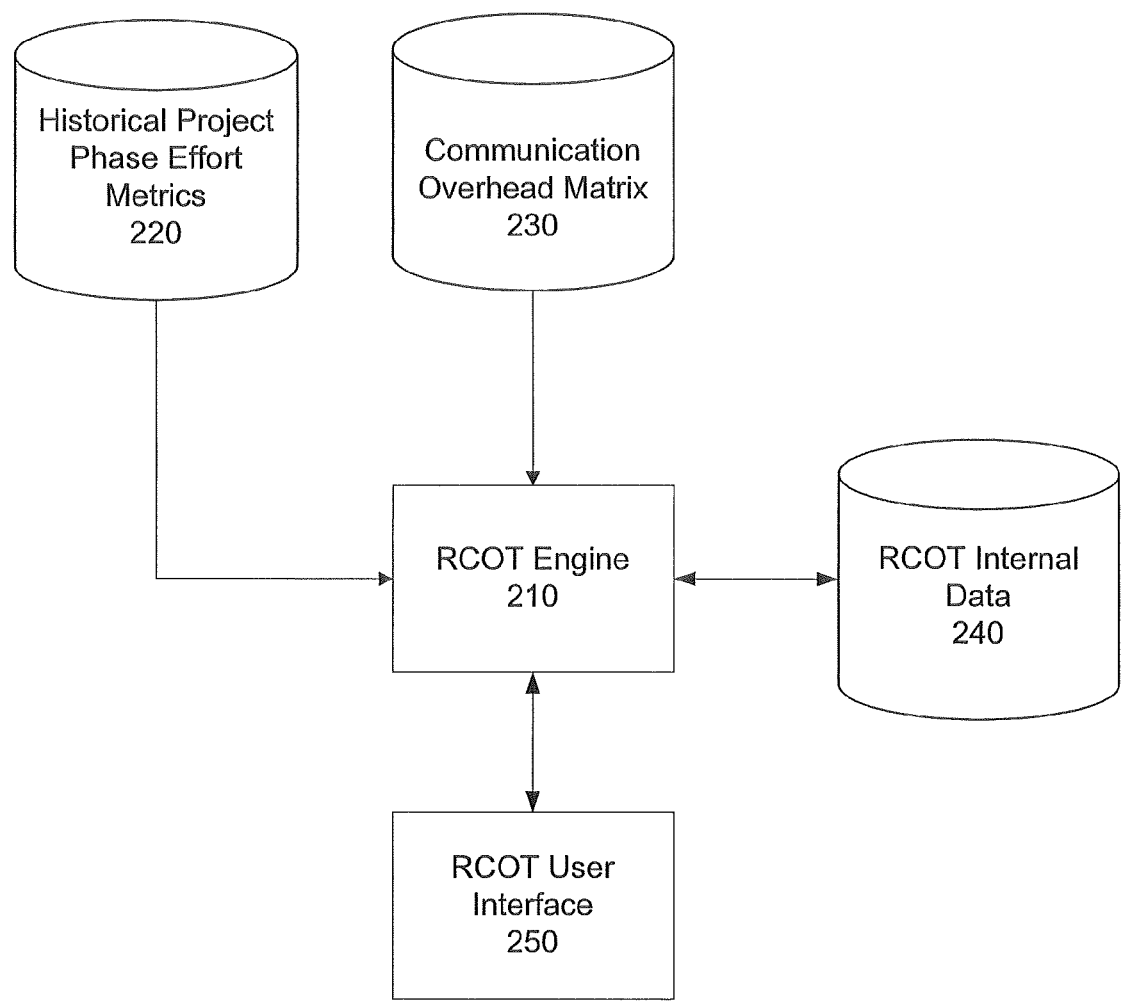
FIG. 2 depicts a block diagram of a resource collaboration optimization tool (RCOT) in accordance with a disclosed embodiment.
Figure 3:
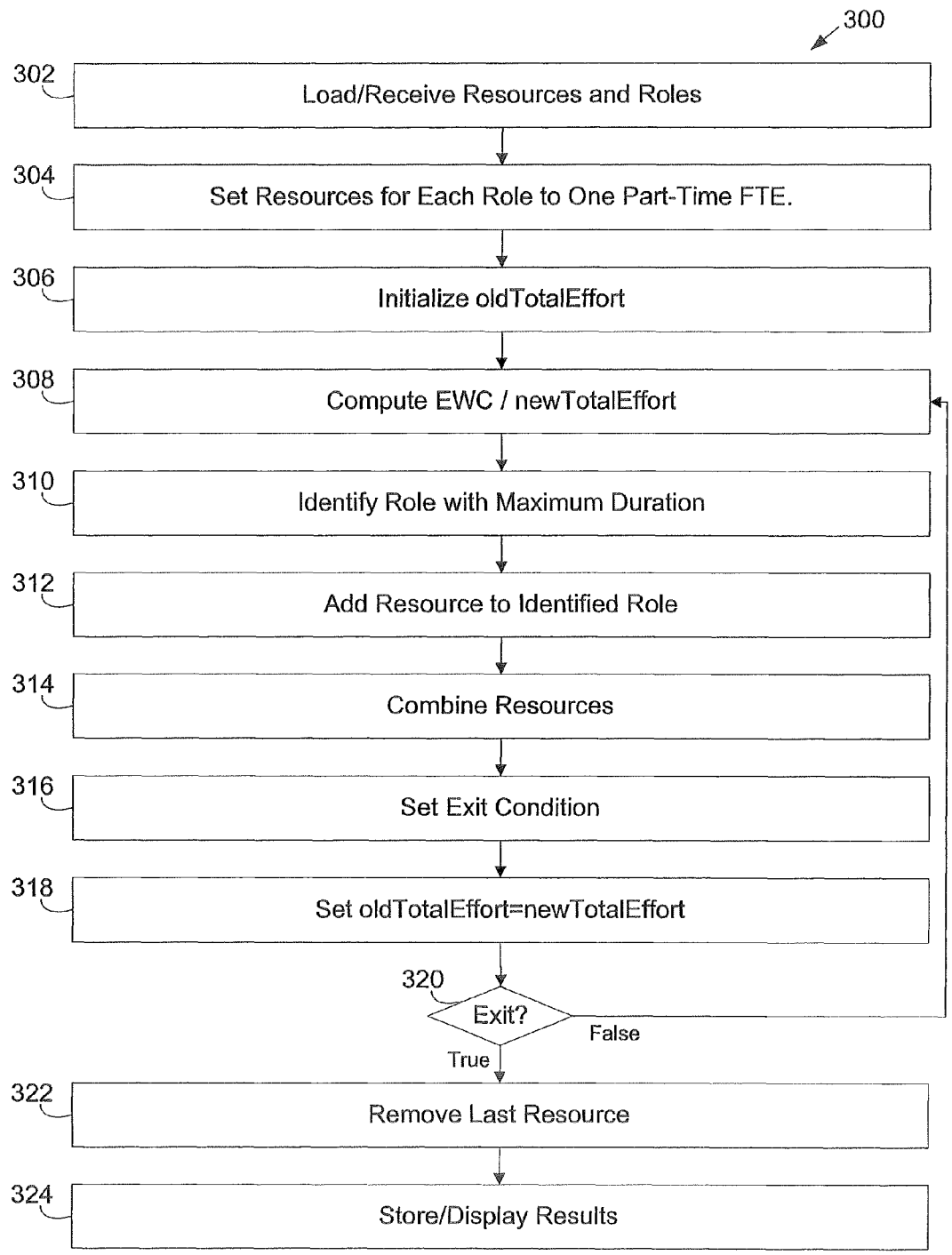
FIG. 3 depicts a flowchart of a process in accordance with a disclosed embodiment.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

FIG. 1 depicts a block diagram of a data processing system 5 in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular applications. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Required project resources can be estimated by considering communication overhead due to the team members' collaboration with one another. Other processes focus on a quantitative estimation of communication overhead effort based on historical records of previous projects together with well-known communication models.

Knowing the rate of communication and collaboration of each role using the communication model and the effort assigned to each team member per phase, the additional overhead per phase per team member or per role can be calculated. This will determine the total effort and duration for each sub-team. The number of team members (part-time and full-time) for each sub-team can be iteratively adjusted to reduce the duration for the sub-team with the largest duration (the most active sub-team). To be more realistic, the duration can be rounded to the whole week or the whole month based on the staffing agreements on the project.

The cost of the entire project depends on the number of resources multiplied by the duration and cost of the resource per month for each resource type. A "role", as used herein, refers to a resource type. An optimization routine as disclosed herein can minimize the total effort, total cost, and total duration and/or a combination of the total cost and duration based on a merit function. This merit function is a function representing the effort or the combination of cost and duration.

Note that this is not a linear optimization because increasing one resource in a sub-team can increase communication for other sub-teams and hence increase the total effort, cost, and duration. Moreover, adding a resource changes the total effort (cost) in a quantized fashion. So, simple linear modeling of this process will not suffice.

Note also that when adding a new part-time resource, two part-time resources of the same resource type (or the same compatible skills) may be combined into a full-time resource, reducing both duration as well as effort due to the reduction in communication overhead.

The techniques disclosed herein can optimize the best team structure that minimizes the total project cost, duration and/or the combination of the two.

FIG. 2 depicts a block diagram of a resource collaboration optimization tool (RCOT) in accordance with a disclosed embodiment. The disclosed RCET includes RCOT engine 210, which is connected to retrieve and use data from various datastores, which can be implemented as a combined datastore, or multiple databases, or hard programmed, or with data retrieved or loaded on demand. RCOT engine 210 can be implemented, for example, in or by a data processing system 100. RCOT engine 210 can use data including historical project phase effort metrics 220, which includes historical data of the effort required for various phases of different projects, and historical resource type communication overhead matrix 230, which includes data relating communication overhead to various resource types and phases, as described herein. The communication overhead matrix 230 includes data which represents two individuals' communication overhead factor based on roles (resource types).

RCOT engine 210 also includes RCOT internal data 240. RCOT user interface 250 allows users to interact with RCOT engine 210, and can display the results of any step described herein. Any data calculated or determined can be stored in any volatile or nonvolatile storage, including memory 108.

There is a common difficulty, addressed by the techniques disclosed herein, in optimizing the project effort for a situation where multiple types of resources (roles) are employed by the project team to deliver the project's deliverables. This optimization can be applied to either optimizing the number of resources for one phase, or for the entire project.

To illustrate a disclosed technique, assume a task with M team members. The effort for each team member m is $e_m$. Therefore, the Total Task Effort will be:

$$\text{Total Effort} = E = \sum_{m=1}^{M} e_m$$

where E is the Total Task Effort, M is the total number of team members, and $e_m$ is the effort for each team member m. Unless otherwise indicated, the terms "role", "type of resource", "resource type", and "sub-team" are used interchangeably herein.

By breaking the teams into smaller sub-teams, a similar equation can be derived. Consider R roles or types of resources. Note that this technique can be applied to any development which requires multiple team members. For example, in the context of software development problem domain projects and without the loss of generality, these roles could be the Project Architect, Database Administrator, Technical Leader, Testing Resource, Programmer, Project Manager, Program Manager, etc. Next, assume that there are n individual team members, n(r), for each resource type r. The index r is used to indicate each role/resource type or sub-team (e.g. per the example above: Architect, Database Administrator, etc). Furthermore, we assume that each individual i of resource type r will be spending an effort of the amount $e_i$; measured in the appropriate units: hours, weeks, months, etc. Typically in a project, each task's effort is measured in hours and the total effort is converted to months. We may express the effort expended by each type of role as:

$$E(r) = \sum_{i=1}^{n(r)} e_i$$

where E(r) is the sum of the effort for role r, $e_i$ is the individual effort for a member of a role r. i is the individual team member from role r with n(r) members. Note that the number of team members, M, is that sum of team members in each role, n(r). Note that $e_i$, the individual effort, contains the resource allocation percent which is 1 for full time and 0.5 for part/half time.

$$M = \sum_{r=1}^{R} n(r)$$

where M is the total number of team members, and n(r) is the number of individual team members for each resource type r (role). Then, the total task effort for all resource types (with no-interactions and/or collaborations) is:

$$\text{Total Effort for All Resource Types} = E_R = \sum_{r=1}^{R} E(r) = \sum_{r=1}^{R} \sum_{i=1}^{n(r)} e_i$$

where $E_R$ is the Total Effort for All Resource Types, E(r) is the sum of the effort for role r, $e_i$ is the individual effort for a member i of a role r with n(r) members. R is the number of roles in the project.

The collaboration among individuals belonging to the project team and to different roles introduces a communication overhead. The amount of the collaboration among various individuals is strongly related to their resource types. The overhead for an individual i of resource type r interacting and collaborating with other resource types is given by:

$$c_i = \sum_{j=1}^{N} \delta_{i,j} \cdot e_i \cdot A_{w(i),w(j)}$$

where $c_i$ and $e_i$ are the individual collaboration effort and original task effort for an individual team member i, respectively. N=n(w(i)) is the number of resources in the resource type that the member i resides (each member communicates with his own team and his own tech lead). $A_{u,v}$ is a matrix indexed by u and v which represents two individuals' communication overhead factor based on their roles (resource types) u and v, and $\delta_{i,j}$ is a matrix whose value is 0 when i and j are the same and 1 otherwise (opposite to the Identity matrix). This is because an individual does not have to communicate with himself. Also, w(i) is a function that defines a role index based on the individual's role. Note that $A_{u,v}$ is not zero when u and v are equal because there is communication between members of the same sub-team.

The matrix A, stored as part of Communication Overhead Matrix 230, contains communication overhead factors that have been obtained from observing prior projects. These communication overhead terms (derived from the historical metrics data pertaining to similar problem domains, stored as part of Historic Project Phase Effort Metrics 220) measure the added effort expended in working and collaborating with other team members based on their roles.

By adding the collaboration and communication effort for an individual to the individual's original task effort, the total effort including communication can be derived.

Individual Effort Including Communication Effort=$EWC_i$=($e_i$+$c_i$)

where $E_R$ is the Total Effort for All Resource Types, $EWC_i$ is the individual Effort With Communication for a team member i, $e_i$ and $c_i$ are the individual effort and individual communication effort for a team member i of a role r with n(r) members. R is the number of roles in the project.

Total Effort for a project containing collaboration and communication overhead can be described as follows:

Total Effort for All Resource Types Including Communication Effort = $EWC$ $$EWC = \sum_{r=1}^{R} \sum_{i=1}^{n(r)} (e_i + c_i)$$

$$EWC = \sum_{r=1}^{R} \sum_{i=1}^{n(r)} \left( e_i + \sum_{j=1}^{N} \delta_{i,j} \cdot e_i \cdot A_{w(i),w(i)} \right) \text{ where}$$

$$N = n(w(i))$$

where EWC is the total effort for all resource types including the collaboration and communication overhead, $e_i$ is the individual effort for a member i of a role r with n(r) members. R is the number of roles in the project. $c_i$ is the individual collaboration effort for an individual team member i. N=n(w(i)) is the number of resources in the resource type that the member i resides. $A_{u,v}$ is a matrix indexed by u and v which represents two individuals' communication overhead factor based on the roles (resource types) u and v, and $\delta_{i,j}$ is a matrix whose value is 0 when i and j are the same and 1 otherwise (opposite to the Identity matrix).

If there is no collaboration and communication overhead, the effort for all other roles will have stayed the same when changing the number of resources for one role and dividing the desired duration by the number of hours per month to get the number of resources in each role. When there is no communication overhead, the total cost stays the same no matter what duration is chosen. One can assume one month for the duration and add a large number of resources to complete the project within the given duration. On the other hand, according to the formulas above, described in more detail in U.S. patent application Ser. No. 11/904,084, adding resources will increase the effort, and therefore drastically increase costs when one attempts to reduce the duration of the project.

For example, based on the above equations adding two part time (50%) resources requires more effort than one full time resource. These factors are taken into account when total effort is computed or the optimization process is performed.

The duration is calculated based on the total effort including the communication and collaboration effort. The Effort FTE (EFTE) for a role can be calculated as follows:

$$EFTE(r) = \frac{\sum_{i=1}^{n(r)} H_i(r)}{h(r)}$$

where r is index for the resource type, EFTE(r) is Effort FTE for resource type r, $H_i(r)$ is the number of hours per month for a specific full-time or part-time resource allocations per resource type r, and h(r) is the number of hours per month for resource type r. Note that the ratio of $H_i(r)/h(r)$ is the percentage of resource allocations per resource type r.

The duration for each team for each phase is calculated as:

$$D_{phase}(r) = \frac{EWC_{phase}(r)}{h(r) * EFTE(r)} = \frac{EWC_{phase}(r)}{\sum_{i=1}^{n(r)} H_i(r)}$$

where $EWC_{phase}(r)$ is the total effort per phase for resource type r, $D_{phase}(r)$ is the duration per phase for resource type r, and EFTE(r), Hi(r), n(r) and h(r) are the same as above.

The total project duration is the duration for a role with the maximum duration and duration for a role is the sum of the durations per phases for the role as follows:

$$D(r) = \sum_{phase} D_{phase}(r) = \sum_{phase} \frac{EWC_{phase}(r)}{\sum_{i=1}^{n(r)} H_i(r)}$$

$$D = \max_{r=1}^{R} D(r) = \max_{r=1}^{R} \left( \sum_{phase} \frac{EWC_{phase}(r)}{\sum_{i=1}^{n(r)} H_i(r)} \right) = \max_{r=1}^{R} \left( \frac{\sum_{phase} EWC_{phase}(r)}{\sum_{i=1}^{n(r)} H_i(r)} \right)$$

The above duration unit is the same unit as H(r). Assuming H is the number of hours in a month, the above duration can be rounded to the nearest month as:

$$[D(r)] = CEILING(D(r))$$

or the duration can be rounded to the nearest week as:

$$[D(r)] = \frac{CEILING(4 * D(r))}{4}$$

Once the total effort and duration are computed as described above, various embodiments include simultaneously satisfying a number of other constraints for an optimum or desired project schedule. Examples of constraints are:

Duration (d) has to be within a limit.
Total cost (c) has to be within a limit.
A combination of cost and duration f(d, c) has to be within a limit.
Number of resources of a given type (e.g., the main architect is only available part time).

This is a non-linear optimization problem which may be solved numerically for the best team structure. Team structure includes the determination of the number of resources in each resource type; quantities n(r) for r=1, ..., R.

An initial step of a disclosed optimization process is to determine what resource types are required for the project. This depends on the nature of the project and requirements. For example, midsize software development projects need the following roles or teams: Architecture, Tech Lead, Software Development, UI Design, Database, and Project Management. If the project is small, some of these roles can be combined if developers can be found with combined skills (e.g., Tech lead and Architecture roles, or software developer and UI designer roles). For large projects, the roles can be further broken down (e.g., adding a tech writer for documentation). Additional roles can be added based on the project requirements (e.g., Data Migration team if the historical data must be preserved). The structure can be obtained from previous history stored in a database.

The estimate that the team has provided for each recourse type per phase is initially used. The communication overhead is added based on the resource structure as described above. The duration is derived by dividing the effort for each resource type by the number of hours per month for each resource type, and the overall duration is the max of duration per resource type.

A part-time resource is initially assigned for each technical lead. A part-time resource is added to the role which results in maximum duration. This will lower the maximum duration for that role but it will also increase the effort and duration of other roles due to collaboration overhead. The process continues to the next maximum effort until they all become level and the cost function is minimized.

Note that this specific example is drawn to the case of software development projects. However, the disclosed embodiments are not limited to software development projects, and can be used for any project that requires multiple members or teams to collaborate and communicate.

In this model, it is assumed that each resource cannot be added or removed at will because it is not easy to dismiss existing resources and then hire new resources of desired skills. Therefore, resources can be idle if one sub-team takes much longer to finish. Also, note that when the duration comes down by adding a resource, the cost can go down as well. However, the corresponding communication contribution to the total cost goes up for added resource which can cause the total cost to go up eventually. After a number of iterations as new resources are added, the duration does not change easily but the cost goes up due to the cost of the additional resource, especially when the duration is rounded to a week or a month. That is the point that the process completes and the optimum structure is obtained.

In a simple case with a relatively small team, the process can start with one full time technical lead initially and add team members only to the role, assuming that the technical lead does not get overloaded. The process can be adjusted for hierarchical team structure. When a team lead is over-loaded, more technical leads can be added. This is not too difficult because the communication overhead of a technical lead can be calculated. The communication effort cannot be more than 100%, or the threshold can be an adjustable parameter in the specific algorithm. For example, in case of a tech lead in a software development project, when the communication effort is at 100%, the tech lead is devoting all of his time only to communicate with his team members and is not able to perform any other productive work. As a further example, when the threshold is at x %, the tech lead is spending x % of his effort in communicating with others and can do other work at (100-x) %, which may necessitate additional resource(s) to help him.

FIG. 3 depicts a flowchart of a process 300 performed by the RCOT, in accordance with a disclosed embodiment. As described herein, the process can be performed, for example, by the RCOT using the RCOT Engine 210, or by a data processing system such as data processing system 100, or by a special-purpose controller, ASIC, or other device, or by a general-purpose data processing system executing a computer program product encoded with computer-executable instructions corresponding to various process steps described herein.

The process below has a tolerance interval for the total effort, total cost or a combination thereof. This means that an optimized effort or cost can be accepted as long as it falls within the tolerance window. This will be an adjustable parameter of the process.

The disclosed RCOT loads or receives the resources and roles for the project (step 302), e.g., from Historical Project Phase Effort Metrics 220. This includes an identification of a plurality of roles.

The disclosed RCOT sets the resources for each role to one part-time FTE. (step 304). As part of this step, the RCOT will consider other constraints for the specific recourse type (e.g., minimum number of leaders).

The disclosed RCOT initializes its data, including setting the oldTotalEffort (or oldTotalCost for cost based methods) to an initial positive number (step 306), preferably a large number. These and other variables can be stored in RCOT internal data 240.

The disclosed RCOT computes the total effort EWC called newTotalEffort (or newTotalCost for cost based methods) (step 308).

The RCOT identifies the role with maximum duration per week or per month, [D(r)] (step 310).

The RCOT adds another part-time resource for that role (step 312).

The RCOT combines two part-time resources into one full time resource if possible (step 314); i.e., check constraints for the resources added to the role, such as when one of the specific resources in this role is only available part-time.

The RCOT calculates and stores one or more of cost, effort, and duration, as described herein, and sets the exit condition to false if the rounded duration, [D(r)], changes from the previous iteration (use oldTotalCost>newTotalCost for cost based methods); otherwise, set the exit condition to true (step 316).

The RCOT sets oldTotalEffort to newTotalEffort (or use oldTotalCost and newTotalCost for cost based methods) (step 318).

The RCOT exits if the exit condition is true, or returns to step 308 (step 320).

The RCOT remove the last resource added which caused an increase in the effort (step 322). The RCOT stores and/or displays the results (step 324), including one or more of the assigned resources, roles, effort cost, and duration.

The optimization process for hierarchical and flat resource structures is very similar. The difference is how the effort or cost is calculated for the structure.

If there are more than 2 levels of part-time resources (25%, 50%, 75%, 100%), the process preferably starts with 25% resources. Then, combine every 25% resource to achieve a higher level of commitment and finally a full-time (100%) commitment.

Other embodiments consider modifications and variations of the specific processes and formulas discussed above. For example, cost is related to the total effort but Project Managers are more concerned about the cost than effort (e.g., in case of off-shore resources). Thus, in lieu of optimizing total effort, it may be preferable to optimize the total cost (described below). In the case of sub-contracting a project, the cost is typically paid by the number of hours that each resource is spending on the project given the salary rate for that resource type. Given the standard salary rate s(r) for resource utilization per resource type per standard unit of time, the cost for each individual i will be given by $z_i(r)=S(r)(e_i(r)+c_i(r))$ for r=1, 2, ... n(r). This is assuming the cost is the same for resources of the same type.

Therefore the cost per each role will be given by:

$$Z(r) = \sum_{i=1}^{n(r)} z_i(r) = S(r) \sum_{i=1}^{n(r)} (e_i(r) + c_i(r))$$

And the total cost with collaboration will be given by:

$$Z = \sum_{r=1}^{R} \sum_{i=1}^{n(r)} z_i(r) = \sum_{r=1}^{R} S(r) \cdot \sum_{i=1}^{n(r)} (e_i(r) + c_i(r))$$

$$Z_{total\ with\ comm} = \sum_{r=1}^{R} \left( S(r) \cdot \sum_{i=1}^{n(r)} \left( e_i + \sum_{j=1}^{N} \delta_{i,j} \cdot e_i \cdot A_{w(i),w(j)} \right) \right)$$

where $N = n(w(i))$

If more detailed information is available about each individual, it can be used in the equation.

$$Z_{total\ with\ comm} = \sum_{r=1}^{R} \sum_{i=1}^{n(r)} S_i(r) \cdot \left( e_i + \sum_{j=1}^{N} \delta_{i,j} \cdot e_i \cdot A_{w(i),w(j)} \right)$$

where $N = n(w(i))$

Another variation is by computing cost based on duration. This is used to calculate the real cost of the team assuming that the cost depends on the duration because resources can be assigned to a project for a fixed duration and not day by day.

Another way to calculate the total project duration for all phases is to calculate the project duration based on the sum of the maximum duration per phase. This is because one phase has to be completed in order to move to the next phase. This approach assumes resources are idle between phases since all resources do not finish their tasks at the same time providing more realistic duration and thus cost.

The duration per phase is maximum of duration of all resources as follows:

$$D_{phase} = \max_{r=1}^{R}(D_{phase}(r))$$

where R is the number of resource types and $D_{phase}$ is the duration per phase which is max of $D_{phase}(r)$. The project duration is as follows:

$$D = \sum_{phase} D_{phase} = \sum_{phase} \max_{r=1}^{R}(D_{phase}(r)) = \sum_{phase} \max_{r=1}^{R}\left(\frac{EWC_{phase}(r)}{\sum_{i=1}^{n(r)} H_i(r)}\right)$$

The above duration unit is the same unit as H(r). Assuming H is the number of hours in a month, the above duration can be rounded to the nearest month as [D]=CEILING(D) or the duration can be rounded to the nearest week as $$[D] = \frac{\text{CEILING}(4*D)}{4}$$

The cost can be calculated in many different ways. In a simple case where everyone receives the same salary, the total cost is:

$$\text{Cost} = S * [D] * \sum_{r=1}^{R} EFTE(r)$$

where S the salary of a resource per month.

In a typical case where the salary is different for each resource type, the total cost is:

$$\text{Cost} = [D] * \sum_{r=1}^{R} (EFTE(r) * S(r))$$

where S(r) is the monthly salary of resource type r. In the most general case where the salary is different for every resource, the total cost is:

$$\text{Cost} = [D] * \sum_{r=1}^{R} \frac{\sum_{i=1}^{n(r)} S_i(r) * H_i(r)}{h(r)}$$

where $S_i(r)$ is the salary of each resource i per month of resource type r. $H_i(r)$ is the percentage of allocation for resource i of resource type r.

Since resources are typically allocated more long term, this cost equation assumes that the team members are allocated for the duration of the project. If there are other policies for resource allocations, it can be formulated as needed. The optimization will use the above calculation for cost instead of effort.

Another variant of this problem is obtained when the effort and cost estimates and attempt are combined to optimize a linear combination of both quantities. That is: a merit function is defined as $M=f(c, d)=a_1.c+a_2.d$ and the technique described above is used to optimize M. This is when Project Managers want to optimize not just the cost or just the duration. This will depend on the preference of the customer who may want to limit cost or duration.

It is often the case that there exist a prior estimate for a project (i.e. there is a pre-allocated funding for a project). In this case, duration can be optimized as long as the cost is with the allocated budget. A non-linear function $M=f(c,d)$ can be used which penalizes more when the cost gets closer to the pre-allocated budget. Obviously, this allocated budget has to be more than the optimum cost, and less than the total estimated original effort time times the cost of the most expensive resource.

It is possible to have more complex merit functions in various embodiments. In some embodiments, it is possible to have various collaborations between team members of different resource types and their leaders. In some embodiments, it is possible to have more refined part time/full time allocations, or it may be possible to model for all types of part time resources with various allocation percentages. In some embodiments, it is possible to have a more complex hierarchical team structure with more collaboration between team members of different resource types and their leaders. All these possibilities may be addressed by using the processes discussed above.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of medium utilized to actually carry out the distribution. Examples of machine usable or machine readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). Instructions stored in a computer-readable medium can form part of RCOT Internal Data 240.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method, comprising:
receiving a number of roles in a data processing system, the roles defining a resource type within a group of people, each resource type defining a person with specific skills to perform the role;
adding a first part-time resource to a role;
after adding the first part-time resource, combining a plurality of part-time resources to produce a corresponding full-time resource for the at least one role and exchanging the corresponding full-time resource for the plurality of part-time resources;
determining, in the data processing system, if a project duration has changed as a result of adding the first part-time resource;
if the project duration has changed, repeating the process by:
adding a subsequent part-time resource to the role; and
determining, in the data processing system, if the project duration has changed as a result of adding the subsequent part-time resource; and
storing results corresponding to resources assigned to the roles,
wherein determining if the project duration has changed comprises accounting for a change in communication overhead between different people resulting from adding said part-time resource, the communication overhead defined as collaboration among individuals belonging to a project team and having different roles.

2. The method of claim 1, further comprising:
after adding a subsequent part-time resource, combining a plurality of the subsequent part-time resources to produce a corresponding full-time resource for the at least one role; and
exchanging the corresponding full-time resource for the plurality of subsequent part-time resources.

3. The method of claim 1, further comprising, if the project duration has changed, removing the added part-time resource from the at least one role.

4. The method of claim 1, further comprising, before adding a first or subsequent part-time resource to a role, identifying a role with a maximum duration per period of time.

5. The method of claim 4, wherein the part-time resource is added to the identified role.

6. The method of claim 1, further comprising, before adding a first or subsequent part-time resource to a role, initializing a total effort variable.

7. The method of claim 1, further comprising calculating and storing a total effort according to the resources assigned to roles.

8. A data processing system comprising:
a processor;
a memory accessible by the processor, in which the data processing system:
receives a number of roles, the roles defining a resource type within a group of people, each resource type defining a person with specific skills to perform the role;
adds a part-time resource to at least one role;
determines if a project duration has changed as a result of adding the part-time resource;
if the project duration has changed, repeats the process at the adding step; and
stores results corresponding to resources assigned to roles;
in which the memory stores a Communication Overhead Matrix comprising communication overhead factors, and
in which determining if a project duration has changed as a result of adding the part-time resource comprises accounting for a change in communication overhead between different people resulting from adding said part-time resource,
wherein determining if a project duration has changed comprises accounting for a change in communication overhead between different people resulting from adding said part-time resource and an added effort expended by said part-time resource in collaborating with the different people based on the role of said part-time resource and the roles of the different people.

9. The data processing system of claim 8, in which the data processing system further, after adding the part-time resource to the at least one role, combines a plurality of part-time resources to produce a corresponding full-time resource for the at least one role.

10. The data processing system of claim 8, in which the data processing system further removes the added part-time resource from the at least one role if the project duration has changed.

11. The data processing system of claim 8, in which the data processing system further, before adding the part-time resource to the at least one role, identifies a role with a maximum duration per period of time.

12. The data processing system of claim 11, wherein the part-time resource is added to the identified role.

13. The data processing system of claim 8, in which the data processing system further, before adding the part-time resource to the at least one role, initializes a total effort variable.

14. The data processing system of claim 8, in which the data processing system further, calculates and stores a total effort according to the resources assigned to roles.

15. A computer program product comprising:
a non-transitory computer readable storage medium comprising computer usable program code embodied therewith, the computer usable program code to, when executed by a processor:
receive a plurality of roles in a data processing system, in which a project to be completed calls for work to be done in each of said roles;
add a first part-time resource to at least one role, in which said part-time resource is a fraction of a full-time equivalent (FTE) resource defined within the at least one role;
determine, in the data processing system, if a project duration has changed as a result of adding the part-time resource;
if the project duration has decreased, repeat the above process by:
adding a subsequent part-time resource to said at least one role, in which said subsequent part-time resource is a fraction of said full-time equivalent (FTE) resource defined within said at least one role; and
determining, in the data processing system, if the project duration has changed as a result of adding the subsequent part-time resource;

if the project duration has increased, remove a most recently added part-time resource;
store results corresponding to resources assigned to roles;
combine a plurality of part-time resources to produce a corresponding full-time resource for the at least one role; and
exchange the corresponding full-time resource for the plurality of part-time resources,
wherein determining if a project duration has changed comprises accounting for a change in communication overhead between different people resulting from adding said part-time resource, the communication overhead defined as collaboration among individuals belonging to a project team and having different roles.

16. The computer program product of claim 15, further comprising computer usable program code to, when executed by the processor, identify a role with a maximum duration per period of time.

17. The computer program product of claim 16, wherein the part-time resource is added to the identified role.

18. The computer program product of claim 15, further comprising, computer usable program code to, when executed by the processor, initialize a total effort variable.

19. The computer program product of claim 15, further comprising computer usable program code to, when executed by the processor, calculate and store a total effort according to the resources assigned to roles.

20. The data processing system of claim 8, in which the communication overhead factors are obtained from observing prior projects.

21. The computer program product of claim 15, wherein said computer usable program code to, when executed by the processor, determine if the project duration has changed comprises computer usable program code to, when executed by the processor, determine a change in total communication overhead between different people resulting from adding said part-time resource, the communication overhead defined as collaboration among individuals belonging to a project team and having different roles.

* * * * *